United States Patent [19]
Clinard et al.

[11] 3,965,470
[45] June 22, 1976

[54] PULSE ANALYZER FOR AN RF MOVING TARGET DETECTOR

[75] Inventors: Glenn G. Clinard, Upland; Kenneth C. Guth, Pomona; Gail R. Mulhollam, Upland, all of Calif.; Frank J. Volk, Hickory Hills, Ill.

[73] Assignee: The United States of America as represented by the Secretary of the Air Force, Washington, D.C.

[22] Filed: Dec. 13, 1972

[21] Appl. No.: 314,645

[52] U.S. Cl. ............................ 343/5 PD; 343/7 PF; 340/258 B
[51] Int. Cl.² ......................................... G01S 9/02
[58] Field of Search .................... 340/258 R, 258 B; 343/5 DP, 5 PD, 7 PF

[56] References Cited
UNITED STATES PATENTS

| | | | |
|---|---|---|---|
| 3,717,864 | 2/1973 | Cook et al. ..................... | 340/258 R |
| 3,727,216 | 4/1973 | Antonio ............................ | 343/5 PD |
| 3,731,305 | 5/1973 | Gehman .......................... | 343/5 PD |

*Primary Examiner*—T.H. Tubbesing
*Attorney, Agent, or Firm*—Joseph E. Rusz; Julian L. Siegel

[57] ABSTRACT

Threshold count pulses, the number of which being proportional to the slope of an impedance curve of a radiating antenna in an RF detection system, are counted in a first counter and, upon receipt of a read pulse representing a threshold of impedance, are transferred to a memory counter while the read pulse delayed resets the first counter. The values in these two counters are compared in a first comparator which emits a pulse if the value of the first counter is greater than that of the memory counter and in the absence of these pulses a sequencer emits a signal indicating a target is moving outwardly. The threshold count pulses also feed an AND gate together with pulses from the first comparator with the AND gate output being fed to a third counter. The third counter is compared in a second comparator which emits a pulse upon equality indicating the target has approached an inner boundary. The third counter is reset with delayed read pulses.

2 Claims, 2 Drawing Figures

PULSE ANALYZER FOR AN RF MOVING TARGET DETECTOR

BACKGROUND OF THE INVENTION

This invention relates to pulse analysis and more particularly to an analyzer of pulses derived from varying impedance input in an RF moving target detector.

In my copending application entitled, DUAL MODE MOVING TARGET SENSOR, filed on Dec. 1972 and having Ser. No. 314,644 there is disclosed an RF detector which detects varying antenna impedance created by a moving target. This varying impedance is processed to produce a series of pulses dependent on the threshold and the rate of variation and these pulses are used as input signals to the present invention to determine if the target is moving in an outwardly direction and if the target has approached a given inner boundary.

SUMMARY OF THE INVENTION

The purpose of the pulse analyzer of the present invention is to determine when a moving target has passed the closest-point-of-approach or when the target comes to within a predictable minimum range with respect to the antenna. The pulse analyzer is fed threshold count pulses from the threshold counter in the RF moving target detector. The first output from the pulse analyzer is the OGT(outgoing target) pulse which occurs when the peak-to-peak amplitude excursions of the antenna impedance characteristis of the RF detector begin to decrease. The second output is the INB (inner boundary) pulse which occurs when the target moves to within a predictable minimum range.

It is therefore an object of this invention to provide a detector for use in an RF detection system that can simultaneously determine if a target is within a given boundary and if a target is moving outwardly.

It is another object to provide an analyzer for use in an RF detection system that can simultaneously determine if a target is within a given boundary without having to process very large numbers of threshold crossings of impedance levels.

It is still another object to provide a method of determining when a target is within a given range and when a target is moving in an outwardly direction by processing pulses derived from a varying antenna impedance.

DETAILED DESCRIPTION OF THE PREFERRED EMBODIMENT

The pulse analyzer detects pulses derived from an RF detector. Two types of pulses are received, read (RD) pulses, and threshold count (TC) pulses. The RF detector radiates electromagnetic energy in a given frequency as determined by a frequency control oscillator. A target in the vicinity of the radiating antenna effects the impedance and the manner of this change is determined. As the impedance can at any time be increasing or decreasing, pulses are being emitted in proportion to the rate of change. The pulses are counted and the pulse counts labeled TC are fed to the pulse analyzer. RD pulses are also fed to the pulse analyzer which indicate the first occurring pulses for a change in the direction of the rate of impedance.

Figure 1:
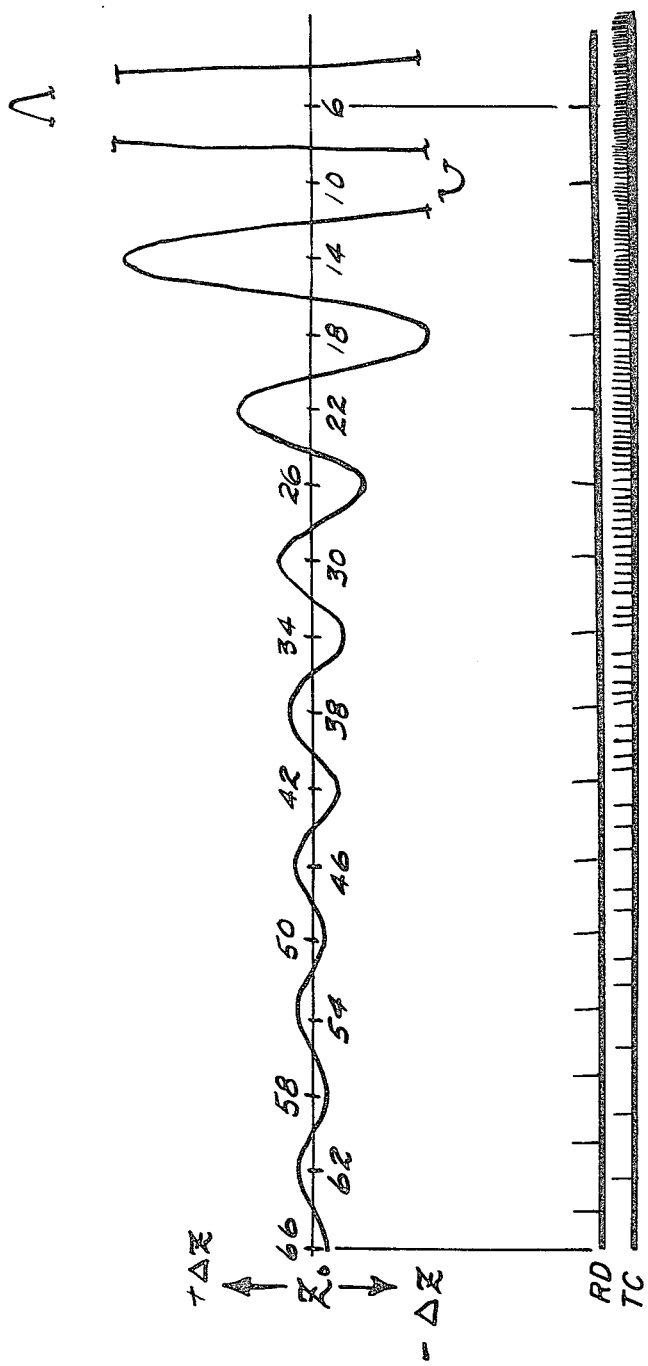
FIG. 1 is a timing diagram useful in the explanation of the invention.

FIG. 1 shows the variation of antenna impedance in the RF detector in relation to range of the target in feet. $Z_0$ is the characteristic impedance and it varies in direction shown as $+\Delta Z$ and $-\Delta Z$. The RD and TC pulses are generated as a result of the changing antenna impedance and are fed to the pulse analyzer.

Figure 2:
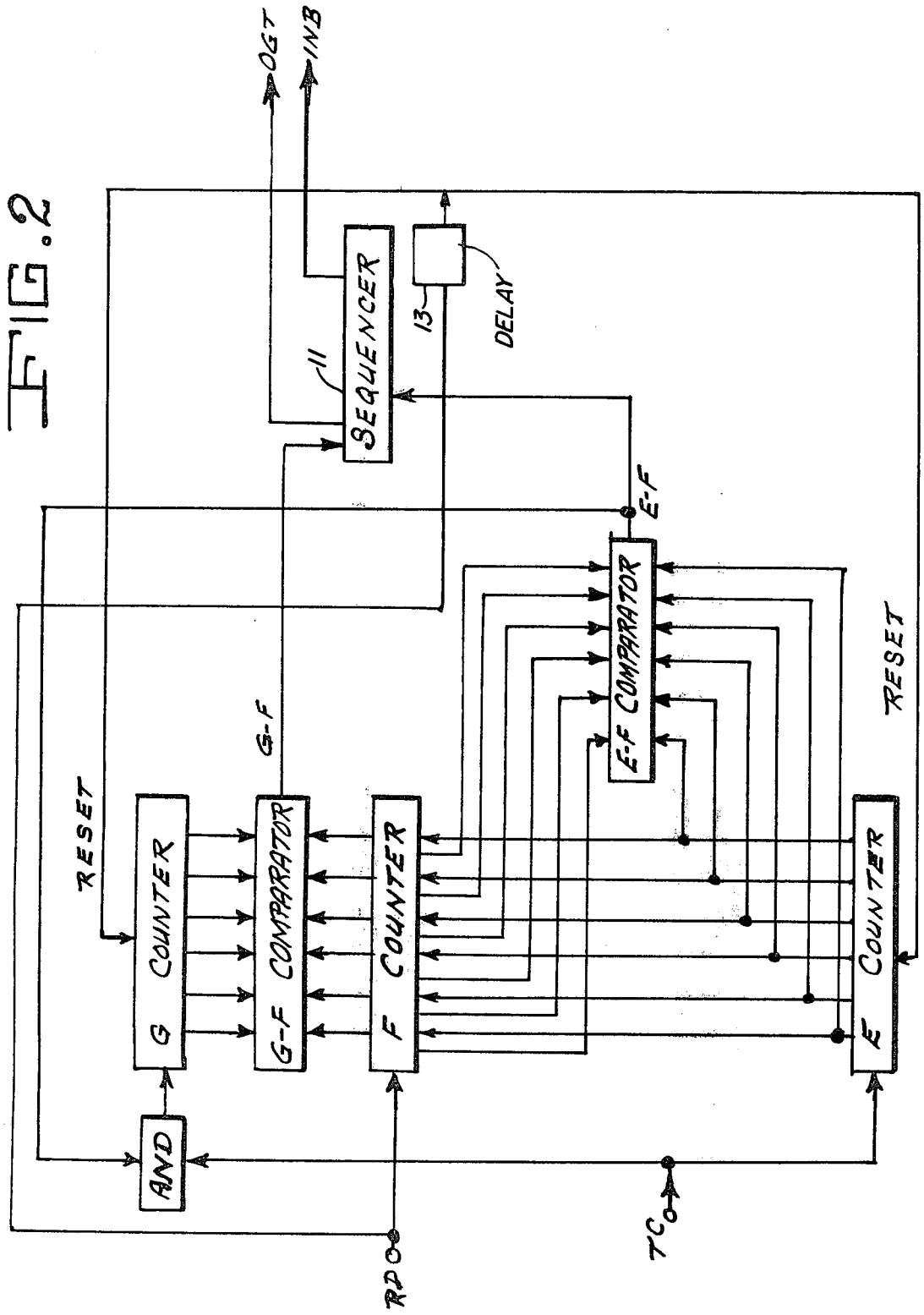
FIG. 2 is a block diagram showing an embodiment of the invention.

Referring to FIG. 2, the pulse analyzer includes three counters, E, F, and G. OGT detector utilizes the E and F counters in conjunction with sequencer 11 and E-F comparator. Sequencer 11 controls the sequence of events taking place within the pulse analyzer. The TC (threshold count) input are pulses coinciding with all the positive threshold crossings or all the negative threshold crossings of the impedance curve except the first positive or negative threshold crossing and these TC pulses are counted in the E counter. Also, the RD (read) input is a pulse coinciding with only the first positive or negative threshold crossing and is used to shift the number contained in the E counter to the F counter. A delayed RD pulse, generated in delay 13, is used to reset the E counter to zero with the F counter being used as a memory. The number contained in the F counter (memory) between RD pulses is the number which was contained in the E counter just prior to the previous RD pulse. Connected between the E and F counters is an E-F comparator which generates a pulse each time the number contained in the E counter exceeds the number in memory in the F counter. All TC pulses prior to the next RD pulse are accumulated in the E counter. The E-F comparator generates an EF pulse when the number reached in the E counter equals the number contained in memory in the F counter. The number then contained in the E counter is shifted to the F counter when the next RD pulse occurs. A delayed RD pulse from delay 13 re-zero's the E counter and then the E counter again accumulates all the TC pulses which occur prior to the next RD pulse. This process is repeated continually.

Since the number of TC pulses are proportional to the peak-to-peak excursions of the antenna impedance characteristic (see FIG. 1) and assuming that the target is approaching the antenna, the number of TC pulses occurring between RD pulses is increasing. Therefore, the number contained in the E counter just prior to an RD pulse must be larger than the number contained in the F counter. Therefore, an EF pulse (E counter exceeds the F counter) will be generated by the E-F comparator some time prior to the next RD pulse as long as the target is approaching the antenna. As the target begins to move away from the antenna (outgoing target), the number contained in the E counter just prior to the next RD pulse will be smaller than the number contained in the F counter. This occurs because the peak-to-peak excursions of the antenna impedance characteristic begin to decrease (and therefore the number of TC pulses begin to decrease between RD pulses) as the target begins to move away from the antenna. Consequently, an EF pulse is not generated at the output of the EF comparator before the next RD pulse occurs. Therefore, the sequencer will generate an OGT (outgoing target) pulse due to the fact that an RD pulse occurred without the occurrence of an EF pulse after the previous RD pulse.

INB (inner boundary) detection utilizes the G and F counters in conjunction with sequencer 11 and the G-F comparator. As the target approaches the antenna, the number of PT (positive threshold) crossings or NT (negative threshold) crossings is greater than the previous number of NT crossings or PT crossings. INB detection is desirable because it eliminates processing very large numbers of threshold crossings as the target closely approaches the antenna. It is also desirable from the warhead need since the probability of kill decreases somewhat as the target closely approaches the antenna.

The OGT detector compares one peak-to-peak excursion of the antenna impedance characteristic with the previous peak-to-peak excursion to determine that the peak-to-peak excursions are increasing (incoming target). An OGT pulse is generated when one peak-to-peak excursion is found to be less than previous excursion.

The input to the G counter is the TC (threshold count) pulses logically ANDed with the EF pulses in AND circuit 15. Therefore, the G counter accumulates TC pulses only after the number contained in the E counter exceeds the number contained in memory in the F counter. The G counter accumulates TC pulses and if the number contained in the G counter equals the number contained in the F counter (memory), the G–F comparator generates a GF pulse. This GF pulse is recognized by sequencer 11 as an inner boundary crossing and in INB pulse occurs at the output of sequencer 11.

What is claimed is:

1. In an RF target detector based on varying impedance, an apparatus for detecting the closest point of approach and the occurrence of the minimum detectable range when fed by read pulses indicative of thresholds of impedance and threshold count pulses indicative of the rate of changing impedance values, comprising:
   a. a first counter fed by the threshold count pulses;
   b. a second counter fed by the value in the first counter upon receipt of a read pulse;
   c. a first means for comparing the counts in the first and second counters and generating a pulse when the count of the first counter exceeds that of the second counter;
   d. a delay circuit fed by the read pulses and generating a delayed reset pulse resetting the first counter;
   e. a sequencer fed by the first comparing means and in the absence of pulses therefrom generating a signal indicative of the outward bound motion of the target;
   f. an AND gate fed by the threshold count pulses and the first comparing means;
   g. a third counter fed by the AND gate and the reset pulses of the delay circuit; and
   h. a second means for comparing the counts in the second and third counters and generating a pulse upon the equality of the counts therefrom and feeding the sequencer.

2. In RF detection based on varying impedance generating read pulses indicative of thresholds of impedances and generating threshold count pulses indicative of the rate of changing impedance values, a method of determining when a target is within a given boundary and when the target is moving in an outwardly direction, comprising:
   a. counting threshold count pulses forming a first count;
   b. transferring the first count into a memory count upon receipt of a read pulse;
   c. resetting the first count upon receipt of a delayed read pulse;
   d. comparing the first count and the memory count forming a first comparison and generating a pulse when the first count is greater than the memory count;
   e. generating a pulse in the absence of a pulse being generated from the first comparison;
   f. counting pulses simultaneously received from the first comparison and the threshold count pulses forming a second count;
   g. comparing the second count with the memory count forming a second comparison;
   h. resetting the second count upon receipt of a delayed read pulse; and
   i. generating a pulse upon the second comparison showing equality, the equality pulse being indicative of the target being within a given boundary.

* * * * *